(12) United States Patent
Shnitko et al.

(10) Patent No.: US 8,914,359 B2
(45) Date of Patent: Dec. 16, 2014

(54) RANKING DOCUMENTS WITH SOCIAL TAGS

(75) Inventors: Yauhen Shnitko, Redmond, WA (US); Dmitriy Meyerzon, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1301 days.

(21) Appl. No.: 12/345,664

(22) Filed: Dec. 30, 2008

(65) Prior Publication Data

US 2010/0169324 A1   Jul. 1, 2010

(51) Int. Cl.
   *G06G 7/00*     (2006.01)
   *G06F 17/30*    (2006.01)

(52) U.S. Cl.
   CPC .... *G06F 17/30675* (2013.01); *G06F 17/30722* (2013.01); *G06F 17/30864* (2013.01)
   USPC ............... 707/723; 707/728; 707/784

(58) Field of Classification Search
   None
   See application file for complete search history.

(56) References Cited

U.S. PATENT DOCUMENTS

| | | | |
|---|---|---|---|
| 5,600,835 A | 2/1997 | Garland et al. | |
| 5,625,767 A * | 4/1997 | Bartell et al. | 345/440 |
| 5,668,897 A * | 9/1997 | Stolfo | 382/283 |
| 5,796,952 A * | 8/1998 | Davis et al. | 709/224 |
| 5,855,015 A * | 12/1998 | Shoham | 715/205 |
| 5,918,236 A * | 6/1999 | Wical | 715/209 |
| 6,018,735 A | 1/2000 | Hunter | |
| 6,615,209 B1 * | 9/2003 | Gomes et al. | 1/1 |
| 6,697,799 B1 | 2/2004 | Neal et al. | |
| 6,732,090 B2 * | 5/2004 | Shanahan et al. | 1/1 |
| 6,748,387 B2 | 6/2004 | Garber et al. | |
| 6,751,605 B2 | 6/2004 | Gunji et al. | |
| 6,820,075 B2 * | 11/2004 | Shanahan et al. | 715/205 |
| 7,167,871 B2 * | 1/2007 | Farahat et al. | 1/1 |
| 7,203,675 B1 * | 4/2007 | Papierniak et al. | 707/600 |
| 7,212,967 B2 | 5/2007 | Wen et al. | |
| 7,293,019 B2 * | 11/2007 | Dumais et al. | 707/754 |
| 7,634,466 B2 * | 12/2009 | Rose et al. | 1/1 |
| 7,707,206 B2 * | 4/2010 | Encina et al. | 707/716 |
| 7,890,485 B2 * | 2/2011 | Malandain et al. | 707/705 |
| 7,958,127 B2 * | 6/2011 | Edmonds et al. | 707/748 |
| 8,380,721 B2 * | 2/2013 | Attaran Rezaei et al. | 707/748 |
| 2003/0061201 A1 * | 3/2003 | Grefenstette et al. | 707/3 |
| 2003/0226100 A1 * | 12/2003 | Farahat et al. | 715/500 |
| 2004/0024760 A1 | 2/2004 | Toner et al. | |
| 2005/0084152 A1 | 4/2005 | McPeake et al. | |
| 2005/0283473 A1 | 12/2005 | Rousso et al. | |
| 2006/0089927 A1 | 4/2006 | Bandyopadhyay et al. | |

(Continued)

OTHER PUBLICATIONS

Becker et al., "Learning Similarity Metrics for Event Identification in Social Media".*

(Continued)

*Primary Examiner* — Daniel Kuddus
(74) *Attorney, Agent, or Firm* — Tom S Wong; Jim Ross; Micky Minhas

(57) ABSTRACT

Technologies are described herein for ranking documents with social tags. A number ranking feature containing a number of times a document was tagged is received. A textual property ranking feature containing a union of each social tag associated with the document is also received. The number ranking feature is transformed into a static input value. Further, the textual property ranking feature is transformed into a dynamic input value. A document rank for the document is determined by inputting the static input value and/or the dynamic input value into a ranking function.

19 Claims, 3 Drawing Sheets

(56) References Cited

U.S. PATENT DOCUMENTS

| | | | |
|---|---|---|---|
| 2006/0206477 A1 | 9/2006 | Dalvi et al. | |
| 2006/0242178 A1 | 10/2006 | Butterfield et al. | |
| 2006/0277173 A1* | 12/2006 | Li et al. | 707/5 |
| 2007/0005567 A1 | 1/2007 | Hermansen et al. | |
| 2007/0043583 A1 | 2/2007 | Davulcu et al. | |
| 2007/0112761 A1* | 5/2007 | Xu et al. | 707/5 |
| 2007/0185858 A1* | 8/2007 | Lu et al. | 707/5 |
| 2007/0185864 A1 | 8/2007 | Budzik et al. | |
| 2007/0233672 A1* | 10/2007 | Sanfacon et al. | 707/5 |
| 2007/0260595 A1 | 11/2007 | Beatty et al. | |
| 2008/0059447 A1 | 3/2008 | Winner et al. | |
| 2008/0275865 A1 | 11/2008 | Kretz et al. | |
| 2009/0125397 A1* | 5/2009 | Gomaa et al. | 705/14 |
| 2009/0327266 A1* | 12/2009 | Tankovich et al. | 707/5 |
| 2009/0327271 A1* | 12/2009 | Amitay et al. | 707/5 |

OTHER PUBLICATIONS

Dubinko et al., "Visualizing Tags over Time".*
Dubinko et al., "Visualizing Tags Over Time", ACM 2007.*
Schenkel, et al., "Efficient Top-k Querying Over Social-Tagging Networks", retrieved at <<http://Isirpeople.epfl.ch/smichel/publications/sigir2008.pdf>>, SIGIR 2008, Jul. 20-24, pp. 8.
Heymann, et al., "Can Social Bookmarking Improve Web Search?", retrieved at <<http://dbpubs.stanford.edu:8090/pub/showDoc.Fulltext?lang=en&doc=2008-2&format=pdf&compression=&name=2008-2.pdf>>, WSDM 2008, Feb. 11-12, pp. 11.
Herzog, et al., "Combining Social and Semantic Metadata for Search in a Document Repository", retrieved at <<http://www.kde.cs.uni-kassel.de/ws/eswc2007/proc/CombiningSocialandSemantic.pdf>>, pp. 14-21.
Noll, et al., "Web Search Personalization via Social Bookmarking and Tagging", retrieved at <<http://iswc2007.semanticweb.org/papers/365.pdf>>, pp. 14.
Ding, et al., "Data Mediation and Interoperation in Social Web: Modeling, Crawling and Integrating Social Tagging Data", retrieved at http://keg.cs.tsinghua.edu.cn/SWSM2008/short%20papers/swsm08_submission_5.pdf>>, pp. 4.

U.S. Official Action dated Aug. 17, 2011 in U.S. Appl. No. 12/141,082.
U.S. Official Action dated Mar. 28, 2011 in U.S. Appl. No. 12/141,082.
U.S. Official Action dated Dec. 13, 2010 in U.S. Appl. No. 12/141,082.
Craswell, et al., "Microsoft Cambrdge at TREC-14: Enterprise Track," 2005, Proceedings of the 14$^{th}$ Text Retrieval Conference, 4 pages.
Holmes, et al., "Improving Precision and Recall for Soundex Retrieval," Proceedings of the International Conference 1 on Information Technology: Coding and Computing, published by IEEE Computer Society, Washington, DC, USA, 2002, 5 pages.
Pouliquen, et al., "Multilingual person name recognition and transliteration," Journal CORELA—Cognition, Representation, Language, 2005, 24 pages.
Zobel, et al., "Phonetic String Matching: Lessons from Information Retrieval," Proceedings of the 19th Annual International ACM SIGIR Conference on Research and Development in Information Retrieval, published by ACM, New York, NY, USA, 1996, pp. 166-172.
Schenkel, et al., "Efficient Top-k Querying Over Social-Tagging Networks", retrieved at <<http://Isirpeople.epfl.ch/smichel/publications/sigir200B.pdf>>, SIGIR 2008, Jul. 20-24, 2008 pp. 8.
Heymann, et al., "Can Social Bookmarking Improve Web Search?", retrieved at <<http://dbpubs.stanford.edu:B090/pub/showDoc.Fulltext?lang=en&doc=200B-2&format=pdf&compression=&name=200B-2.pdf>>, WSDM 2008, Feb. 11-12, 2008 pp. 11.
Herzog, et al., "Combining Social and Semantic Metadata for Search in a Document Repository", retrieved Oct. 13, 2008 at <<http://www.kde.cs.uni-kassel.de/ws/eswc2007/proc/CombiningSocialandSemantic.pdf>>, pp. 14-21.
Noll, et al., "Web Search Personalization via Social Bookmarking and Tagging", retrieved Oct. 13, 2008 at <<http://iswc2007.semanticweb.org/papers/365.pdf>>, pp. 14.
Ding, et al., "Data Mediation and Interoperation in Social Web: Modeling, Crawling and Integrating Social Tagging Data", retrieved Oct. 13, 2008 at <<http://keg.cs.tsinghua.edu.cn/SWSM200B1short%20papers/swsmOB_submission_5.pdf>>, pp. 4.

* cited by examiner

RANKING DOCUMENTS WITH SOCIAL TAGS

BACKGROUND

Search applications (commonly referred to as search engines) are designed to retrieve documents from a database based on a query containing one or more search terms. In particular, conventional search applications may retrieve documents having at least one document property matching the terms in the query. The document property may include text contained in the document. Examples of text contained in the document include the title and the body of the document. The document property may further include text that is not contained in the document. An example of text that is not contained in the document is anchor text, which is the text contained in a hyperlink to the document.

In order to return more relevant documents, the search application may rank a set of candidate documents (i.e., the set of documents satisfying the query) according to their predicted relevance. The search application may then return the documents in order of their relevance. For example, the search application may return the documents in order from the most relevant to the least relevant. If a large number of documents are retrieved in response to a given query, the search application may also return only a subset of the candidate documents that are the most relevant. In this way, the user can more efficiently analyze the returned documents.

The search application may rank documents according to a ranking function, which may associate a ranking score for each candidate document. For example, a simple ranking function may attach a greater relevance to documents in which the search terms are contained in the titles of the documents. The quality of ranked documents returned by the ranking function depends largely on the ranking function itself, as well as the ranking features (i.e., the inputs) entered into the ranking function. Thus, the quality of the ranked documents may be improved by also improving the ranking features entered into the ranking function.

It is with respect to these considerations and others that the disclosure made herein is presented.

SUMMARY

Technologies are described herein for ranking documents with social tags. In particular, a user may associate social tags with a document. Each social tag may contain one or more words. For example, the social tags may describe the document, categorize the document, and provide other suitable information about the document. The social tags and/or information derived from the social tags may be utilized to improve a ranking function by adding additional ranking features, in addition to conventional document ranking features, into a ranking function, such as a two-layer neural network ranking function. Examples of ranking features include a static input value that is query independent and a dynamic input value that is query dependent. The social tags may also be utilized as a document property to improve document selection. In particular, the social tags may provide additional terms with which the query can be matched because the social tags may contain terms not found in conventional document properties, such as in the body of the document or in anchor text.

According to one embodiment presented herein, a method is provided for synchronizing ranking documents based on social tags. A number ranking feature containing a number of times a document was tagged is received. A textual property ranking feature containing a union of each social tag associated with the document is also received. The number ranking feature is transformed into a static input value. Further, the textual property ranking feature is transformed into a dynamic input value. A document rank for the document is determined by inputting the static input value and/or the dynamic input value into a ranking function.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for ranking documents with social tags. Through the utilization of the technologies and concepts presented herein, multiple documents may each be associated with one or more social tags. The social tags and/or information derived from the social tags may be transformed into ranking features, which are entered into a ranking function that outputs a ranking score for a given document. According to further embodiments, the social tags may also be utilized as a document property. A search application may then retrieve documents based on the social tags as well as other document properties.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
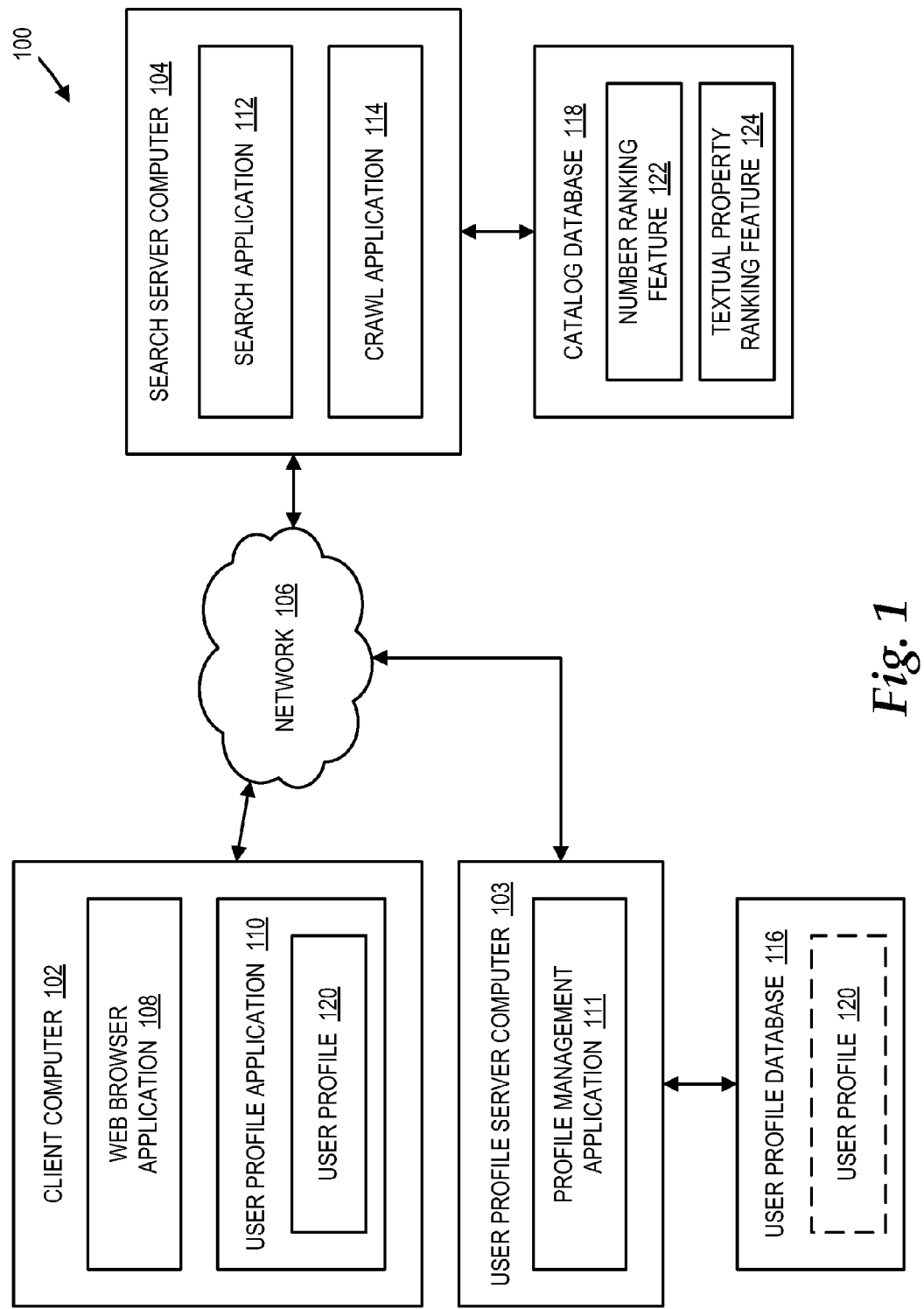
FIG. 1 is a network architecture diagram showing a network architecture capable of ranking documents with social tags.

In the following detailed description, references are made to the accompanying drawings that form a part hereof, and which are shown by way of illustration specific embodiments or examples. Referring now to the drawings, in which like numerals represent like elements through the several figures, a computing system and methodology for ranking documents with social tags will be described. In particular, FIG. 1 illustrates a simplified network architecture 100 including a client computer 102, a user profile server computer 103, and a search server computer 104 operatively coupled via a network 106. The network may be any suitable network, such as a local area network ("LAN") or the Internet. In one embodiment, the network is a private network, such as an enterprise network.

The client computer 102 includes a web browser application 108 and a user profile application 110. The user profile server computer 103 includes a profile management application 111. The user profile server computer 103 is operatively coupled to a profile database 116. The search server computer 104 includes a search application 112 and a crawl application 114. The search server computer 104 is operatively coupled to a catalog database 118. It should be appreciated that the network architecture 100 described herein is merely an example and is not intended to be limiting. Other configurations of the network architecture 100 as contemplated by those skilled in the art may be similarly utilized.

According to embodiments, a user operating the client computer 102 opens the user profile application 110 to access one or more documents (not shown). The user profile application 110 may be any suitable application program operative to enable a user to associate social tags with the documents. The user profile application 110 may be a standalone application or may be implemented as part of another application, such as a productivity application (e.g., a word processing application).

As used herein, a social tag is a text string containing one or more terms associated with a given document. For example, the social tags may describe the document, categorize the document, and provide other suitable information about the document. The social tags may be user-generated or provided from a third party. The user profile application 110 may enable the user to create new social tags and/or select from previously-generated social tags. The documents may be stored on the client computer 102, on the user profile server computer 103, on the search server computer 104, or on a separate storage accessible through the network 106. Documents stored at a remote location may be publicly-accessible or privately-accessible by a limited subset of users (e.g., users on an enterprise network). In one embodiment, the documents are remotely accessible via a uniform resource locator ("URL").

Once the user has associated social tags with the documents, the user profile application 110 may store and index the social tags in a user profile 120. The user profile application 110 may provide the user profile 120 to the profile management application 111, which manages multiple user profiles, such as the user profile 120, on the profile database 116. For example, the user profile 120 may include a table containing links to documents and social tags associated with each document. The user profile 120 may be updated as the user adds, modifies, or deletes social tags. In one embodiment, the user profile 120 is marked as changed when it is updated.

The profile management application 111, through the profile database 116, may be operative to store and index one or more user profiles, each of which is associated with a different user. Each user profile may include social tags that a given user has associated with a document. Thus, multiple user profiles may include social tags that multiple users have associated with a document. The profile database 116 may store the user profile 120 as indicated by the dotted line in FIG. 1. The crawl application 114 may be operative to periodically traverse the profile database 116 to find changes to the user profile 120 for the user. For example, the crawl application 114 may clear the marking indicating the user profile 120 has changed after traversing the user profile 120. The crawl application 114 may be operative to traverse multiple profile databases, such as the user profile database 116, in order to retrieve all relevant social tags. In particular, the crawl application 114 may access the user profile database 116 via the profile management application 111.

Upon finding changes to the user profiles, the crawl application 114 may be further operative to collect the social tags and to update the catalog database 118 with the social tags (and their associated documents) as well as with information derived from the social tags. Examples of information derived from the social tags include a number ranking feature 122 and a textual property ranking feature 124 for each document. The number ranking feature 122 is the number of times that a given document was tagged. That is, the number ranking feature 122 may refer to the number of times that users have associated social tags to a given document. The textual property ranking feature 124 is a textual stream containing a union of all social tags associated with a given document. The number ranking feature 122 and the textual property ranking feature 124 may be created based on the social tags from a single user or an aggregation of social tags from multiple users.

The crawl application 114 may perform a two-phase crawl, according to embodiments. In the first phase, the crawl application 114 collects and indexes documents and user profiles and extracts social tags from the user profiles. In the second phase, the crawl application 114 indexes social tags as part of the documents to which they apply. In one embodiment, the second phase is started after all documents and user profiles are known or after the first phase of the crawl completed. In one example implementation, the crawl application 114 indexes social tags in a secondary catalog (e.g., an inverted index) that is separate from the primary catalog for indexing the documents. Other properties stored in the secondary index may include anchor text.

According to further embodiments, a user operating the client computer 102 opens the web browser application 108 and accesses the search application 112 through the web browser application 108. For example, the search application 112 may be accessible via a URL. Upon accessing the search application 112 through the web browser application 108, the user may enter a search query containing one or more search terms into the search application 112.

Upon receiving the search query, the search application 112 may search an inverted index to retrieve candidate documents satisfying the search query from a corpus of documents. The inverted index may contain a mapping of terms to their associated documents. The terms contained in the inverted index may be collected from one or more document properties. In one embodiment, a candidate document satisfies the search query if the document properties associated with the candidate document contain all of the terms in the search query. In another embodiment, a candidate document satisfies the search query if the document properties associated with the candidate document contain at least one of the terms in the search query.

In one embodiment, the textual property ranking feature 124 may be considered a document property that the search application 112 uses to retrieve candidate documents. That is, the social tags contained in the textual stream may be included in the inverted index. If the query terms are contained in the textual property ranking feature 124, then the corresponding document may be considered a candidate document. The textual property ranking feature 124 may contain social tags that are not found in conventional document properties, such as in the body of the document or in the anchor text. Thus, by using the textual property ranking feature 124 as a document feature, the search application 112 may retrieve more documents that would otherwise not be found by searching only conventional document properties.

Upon retrieving the candidate documents that satisfy the search query, the search application 112 may rank the candidate documents according to the ranking function. Any suitable ranking function as contemplated by those skilled in the art may be utilized. An example of a ranking function is a two-layer neural network scoring function which accepts one or more ranking features as input values and outputs a ranking score for a given document. In one embodiment, the ranking score is proportional to the relevancy of the document. That is, a higher ranking score may indicate a higher relevancy of the document with respect to the search query, and a lower ranking may indicate a lower relevancy of the document with respect to the search query. Further, one of the inputs to the two-layer neural network is Okapi Simple Best Match 25F (BM25F), which aggregates ranking features of documents according to their weights. Dynamic ranking features can be combined into BM25F, the output of which is then added into the two-layer neural network. Static ranking features can be directly input into the two-layer neural network. As described below, dynamic ranking features are query dependent, while static ranking features query independent.

In one embodiment, the number ranking feature 122 produces a static input value into the two-layer neural network ranking function or other suitable ranking function. A static input value refers to an input value that is query independent. That is, regardless of the query entered by the user into the search application 112, the static input value remains the same. The static input value may be determined according to the following equation, where $N_{st}$ is the number ranking feature 122, $K_{Nst}$ is a tunable parameter, $M_{Nst}$ is a normalization constant for normalizing the mean, and $S_{Nst}$ is a normalization constant for normalizing the standard deviation.

$$\frac{\frac{N_{st}}{K_{Nst}+N_{st}} - M_{Nst}}{S_{Nst}}$$

Tunable parameters are usually computed by a special tuner application which takes as its inputs a form of a ranking function, a set of selected queries, and all pre-computed ranking features on a selected set of documents that satisfies the queries. Those documents may be manually analyzed according to their relevance to some queries. The tuner application then attempts to choose tunable parameters so that the score produced by ranking function better compliments the manual analysis.

It should be appreciated that the normalization constants, $M_{Nst}$ and $S_{Nst}$ may be removed from the above formula in other ranking functions. For example, in the case where a support vector machine or a linear combination replaces the two-layer neural network ranking function, the normalization constants, $M_{Nst}$ and $S_{Nst}$, may be removed (e.g., $M_{Nst}=0$; $S_{Nst}=1$). It should further be appreciated that the equation described above is merely an example and is not intended to be limiting. In particular, other increasing functions may be similarly utilized.

In one embodiment, the textual property ranking feature 124 produces a dynamic input value into BM25F, the output of which is then input into the two-layer neural network ranking function or other suitable ranking function. A dynamic input value refers to an input value that is query dependent. That is, the dynamic input value may vary depending on the query entered by the user into the search application 112.

The dynamic input value may be determined by obtaining relevant data values from the textual property ranking feature 124 and inputting those data values into the BM25F ranking function. Examples of data values include the number of times a given term from the query appears in the textual property ranking feature 124, the length of the textual property ranking feature 124, and the average length of the textual property ranking feature 124 across the entire corpus of documents. In one embodiment, an illustrative dynamic input value, $TF_t'$, is determined according to the following equation, where an additional sum component is added to the BM25F ranking function. In the additional sum component, $TF_{t,Pst}$ is the number of times a given term appears in the textual property ranking feature 124 (commonly referred to as the term frequency), $DL_{Pst}$ is the length of (i.e., the number of terms in) the textual property ranking feature 124, $AVDL_{Pst}$ is the average length of the textual property ranking feature 124 across the corpus of documents, $w_{Pst}$ is a weight of a property that is a tunable parameter, and $b_{Pst}$ is a normalization constant for normalizing a length.

$$TF_t' = \left( \sum_{p \in D} TF_{t,p} \cdot w_p \cdot \frac{1+b_p}{\left(\frac{DL_p}{AVDL_p} + b_p\right)} + TF_{t,Pst} \cdot w_{Pst} \cdot \frac{1+bPst}{\left(\frac{DL_{Pst}}{AVDL_{Pst}} + b_{Pst}\right)} \right)$$

Figure 2:
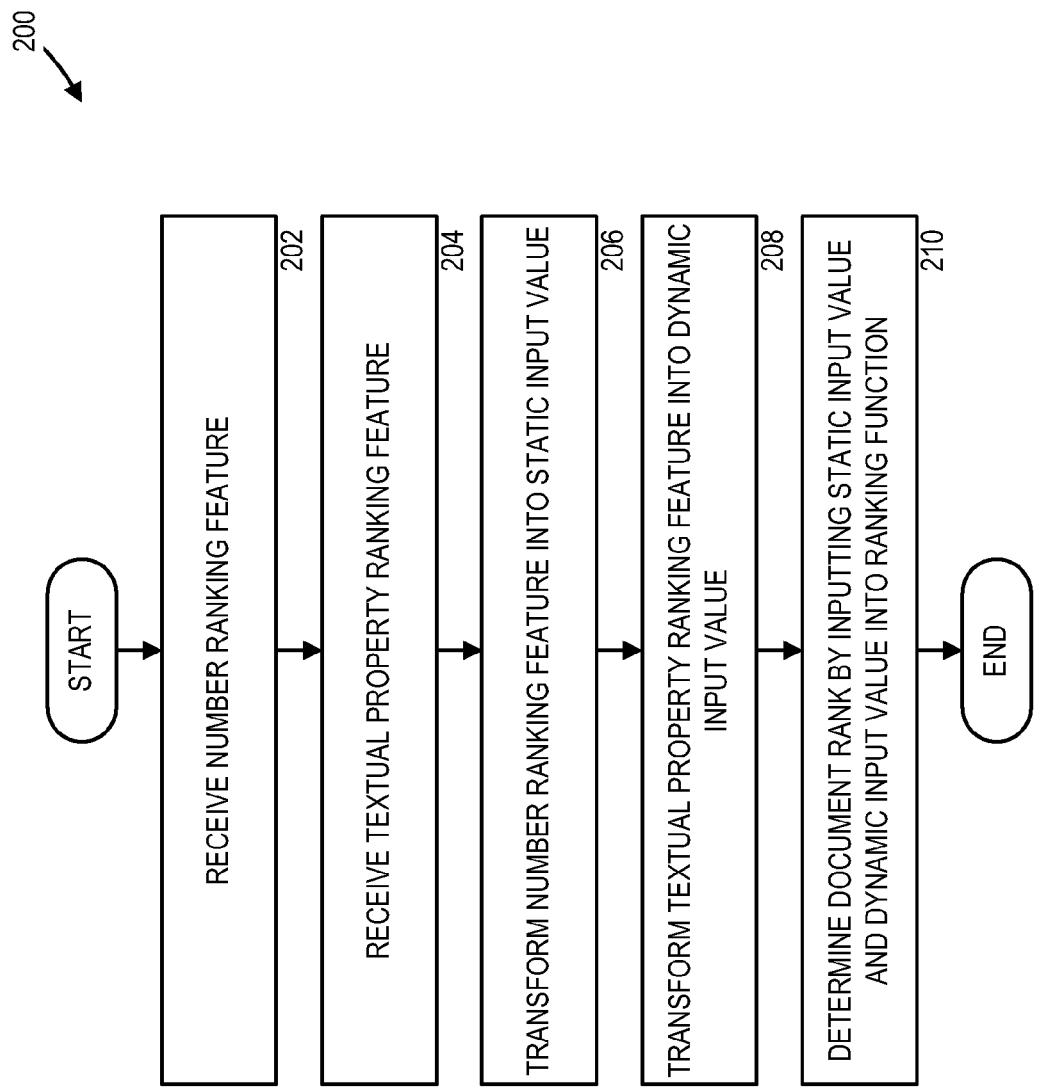
FIG. 2 is a flow diagram showing an illustrative process for ranking documents with social tags.

Referring now to FIG. 2, additional details will be provided regarding the embodiments presented herein for providing ranking documents with social tags. In particular, FIG. 2 is a flow diagram illustrating one method for synchronizing ranking documents with social tags. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

The routine 200 begins at operation 202, where the search application 112 receives the number ranking feature 122. As previously described, the number ranking feature 122 may indicate the number of times that a given document has been tagged by one or more users. For example, if ten users have associated social tags to a given document, then the number ranking feature 122 may indicate that the document has been tagged ten times. The number ranking feature 122 may provide an indication of the popularity of a given document. The number ranking feature 122 is considered a static feature because the number of times that a given document has been tagged is not related to query. Since the number ranking feature 122 is a static feature, determinations of input values that involve the number ranking feature 122 may be performed at pre-query time or at query time. Upon the search application 112 receiving the number ranking feature 122, the routine 200 proceeds to operation 204.

At operation 204, the search application 112 receives the textual property ranking feature 124. As previously described, the textual property ranking feature 124 may be a textual stream containing a union of all social tags applied to a given document. The textual stream may include repeats of social tags. For example, if two separate users associated a given term to a document, then the textual stream may include two occurrences of the term.

At least some of the information derived from the textual property ranking feature 124 is considered a dynamic feature if is related to the query. An example of information derived from the textual property ranking feature 124 that is query dependent is the number of times a given term appears in the textual property ranking feature 124. In particular, the terms in the query may be chosen for determining the number of times they appear in the textual property ranking feature 124. Since the number of times a given term appears in the textual property ranking feature 124 is a dynamic (query dependent) feature, determinations of input values that involve the number of times a given term appears in the textual property ranking feature may be performed at query time.

Other examples of information derived from the textual property ranking feature 124 may include the length of the textual property ranking feature 124 and the average length of the textual property ranking feature 124 across an entire corpus of documents. Upon the search application 112 receiving the textual property ranking feature 124, the routine 200 proceeds to operation 206.

At operation 206, the search application 112 transforms the number ranking feature 122 into a static input value. The search application 112 may transform the number ranking feature 122 using any suitable increasing function, such as the one previously described. The routine 200 then proceeds to operation 208 where the search application 112 transforms the textual property ranking feature 124 into a dynamic input value. For example, the dynamic input value may be determined by entering information derived from the textual property ranking feature 124 into the BM25F ranking function.

At operation 210, the search application 112 inputs the static input value and/or the dynamic input value into a ranking function, which outputs a ranking score for a given document. For example, the search application 112 may input the static input value and the dynamic input value into a two-layer neural network ranking function.

Figure 3:
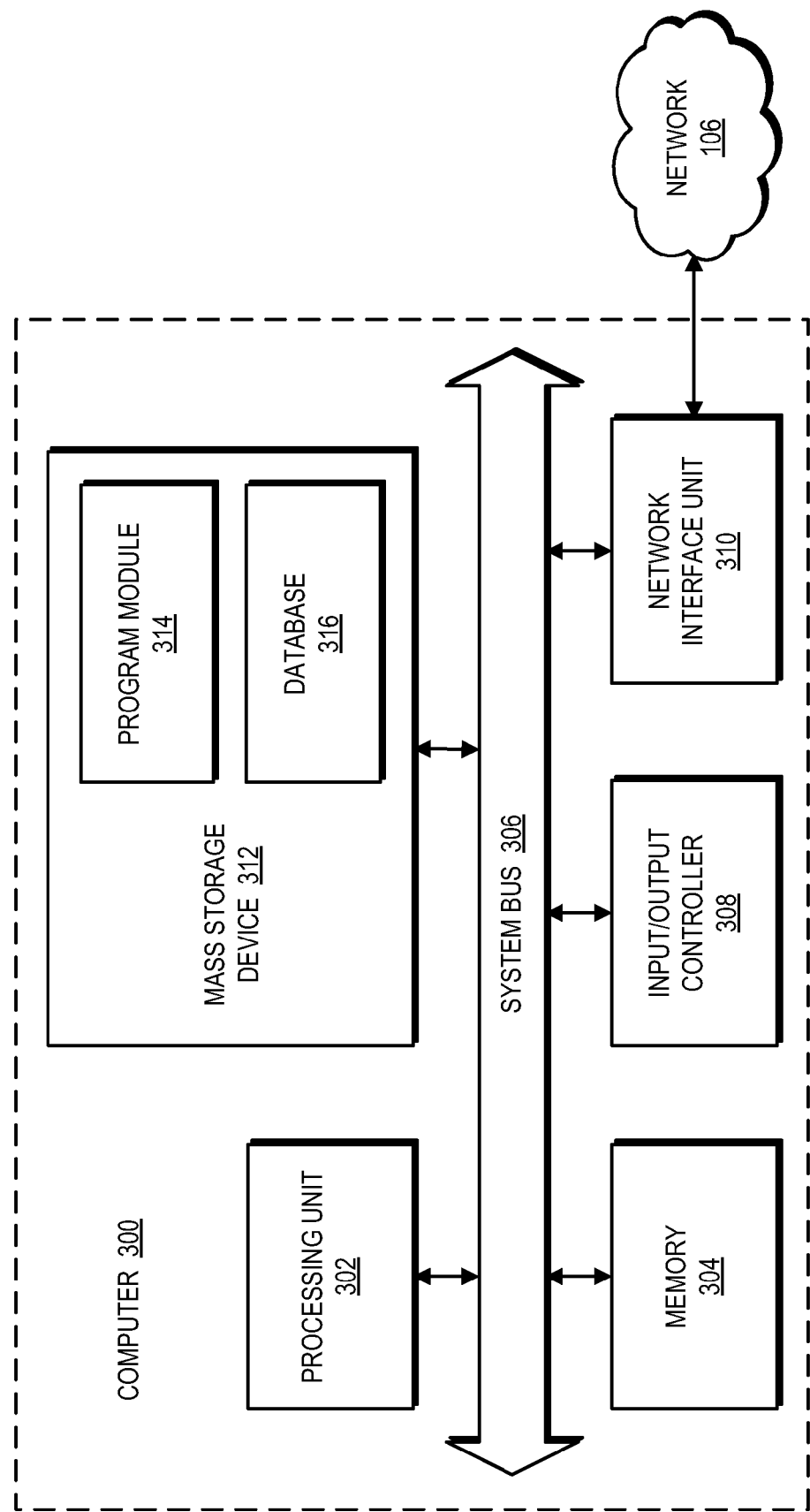
FIG. 3 is a computer architecture diagram showing an illustrative computer hardware architecture for a computing system capable of implementing the embodiments presented herein.

Referring now to FIG. 3, an exemplary computer architecture diagram showing a computer 300 is illustrated. Examples of the computer 300 may include the client computer 102, the user profile server computer 103, and the server computer 104. The computer 300 includes a processing unit 302 ("CPU"), a system memory 304, and a system bus 306 that couples the memory 304 to the CPU 302. The computer 300 further includes a mass storage device 312 for storing one or more program modules 314 and one or more databases 316. Examples of the program modules 314 may include the web browser application 108, the user profile application 110, the search application 112, and the crawl application 114. The routine 200 may also be embodied in a program module and executed by the computer 300. Examples of the databases 316 may include the user profile database 116 and the catalog database 118. The mass storage device 312 is connected to the CPU 302 through a mass storage controller (not shown) connected to the bus 306. The mass storage device 312 and its associated computer-readable media provide non-volatile storage for the computer 300. Although the description of computer-readable media contained herein refers to a mass storage device, such as a hard disk or CD-ROM drive, it should be appreciated by those skilled in the art that computer-readable media can be any available computer storage media that can be accessed by the computer 300.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 300.

According to various embodiments, the computer 300 may operate in a networked environment using logical connections to remote computers through a network, such as the network 106. The computer 300 may connect to the network 106 through a network interface unit 310 connected to the bus 306. It should be appreciated that the network interface unit 310 may also be utilized to connect to other types of networks and remote computer systems. The computer 300 may also include an input/output controller 308 for receiving and processing input from a number of input devices (not shown), including a keyboard, a mouse, a microphone, and a game controller. Similarly, the input/output controller 308 may provide output to a display or other type of output device (not shown).

Based on the foregoing, it should be appreciated that technologies for ranking documents with social tags are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for ranking documents with social tags, the computer-implemented method configured on a computer having a processor and a memory, the computer-implemented method comprising:

collecting information from at least one user profile regarding one or more social tags, the social tags comprising a text string containing one or more terms at least one of describing, categorizing and providing information regarding a document, and being indexed and stored in user profile tables separate from the corresponding documents they are associated with;

creating a number ranking feature based on the social tags, the number ranking feature containing a number of times the document was tagged with the social tags associated with a plurality of user profiles;

creating a textual property ranking textual stream based on the social tags, the textual property ranking textual stream containing a union of all the social tags associated with the document;

transforming the number ranking feature into a static input value by applying a normalization constant to the number ranking feature;

transforming the textual property ranking textual stream into a dynamic query dependent input value, wherein the dynamic query dependent input value includes a number of times a given term in a query appears in the textual property ranking textual stream; and determining a document rank for the document by inputting the static input value and the dynamic query dependent input value into a ranking function.

2. The computer-implemented method of claim 1, further comprising:

receiving a query;

identifying a plurality of documents that satisfy the query; and sorting the plurality of documents according to their corresponding document rank.

3. The computer-implemented method of claim 2, wherein identifying a plurality of documents that satisfy the query comprises identifying the plurality of documents where the corresponding textual property ranking textual stream for each document contains each term in the query.

4. The computer-implemented method of claim 1, wherein the number ranking feature contains the number of times the document was tagged with the social tags by multiple users.

5. The computer-implemented method of claim 1, wherein the textual property ranking textual stream contains the social tags created by multiple users.

6. The computer-implemented method of claim 1, wherein the ranking function comprises Okapi Simple Best Match 25F (BM25F); and the method further comprising inputting an output of Okapi Simple Best Match 25F (BM25F) into a two-layer neural network ranking function.

7. The computer-implemented method of claim 1, wherein transforming the textual property ranking textual stream into a dynamic query dependent input value comprises inputting textual property information associated with the textual property ranking textual stream into a Okapi Simple Best Match 25F (BM25F) ranking function to generate the dynamic query dependent input value.

8. The computer-implemented method of claim 7, wherein the textual property information further comprises a length of the textual property ranking textual stream, and an average length of a plurality of textual property ranking textual streams across a corpus.

9. A computer system comprising:

a processor;

a memory operatively coupled to the processor; and a program module (i) which executes in the processor from the memory and (ii) which, when executed by the processor, causes the computer system to rank documents with social tags by:

crawling a user profile database to collect the social tags associated with a document, the social tags comprising a text string containing one or more terms at least one of describing, categorizing and providing information regarding the document, and being indexed and stored in user profile tables separately from the document they are associated with;

determining, based on the social tags, a number ranking feature containing a number of times the document was tagged with the social tags;

determining, based on the social tags, a textual property ranking textual stream containing a union of all the social tags associated with the document;

transforming the number ranking feature into a static input value by applying a normalization constant to the number ranking feature;

transforming the textual property ranking textual stream into a dynamic query dependent input value, wherein dynamic query dependent input value includes a number of times a given term in a query appears in the textual property ranking textual stream; and determining a document rank for the document by inputting the static input value and the dynamic query dependent input value into a ranking function.

10. The computer system of claim 9, wherein the profile database comprises a plurality of user profiles, each user profile comprising the social tags associated to the document by a user, and wherein crawling the profile database to obtain the social tags associated with a document comprises crawling the profile database to obtain the social tags associated with the document from the plurality of user profiles.

11. The computer system of claim 10, wherein crawling a profile database to obtain the social tags associated with a document comprises crawling the user profiles marked as changed to indicate that the social tags have been added, modified, or deleted.

12. The computer system of claim 9, wherein the ranking function comprises Okapi Simple Best Match 25F (BM25F); and the program module which, when executed by the processor, further causes the computer system to rank documents with social tags by inputting an output of Okapi Simple Best Match 25F (BM25F) into a two-layer neural network ranking function.

13. The computer system of claim 9, wherein transforming the textual property ranking textual stream into a dynamic query dependent input value comprises inputting textual property information associated with the textual property ranking textual stream into a Okapi Simple Best Match 25F (BM25F) ranking function to generate the dynamic query dependent input value.

14. The computer system of claim 13, wherein the textual property information further comprises a length of the textual property ranking textual stream, and an average length of a plurality of textual property ranking textual streams across a corpus.

15. One of an optical disk, a solid state storage device or a magnetic storage device having computer-executable instructions stored thereon which, and executed by a computer, cause the computer to:

crawl documents to obtain document ranking features;

crawl a profile database to collect social tags associated with a document, the profile database comprising a plurality of user profiles associated with a plurality of users, each user profile comprising the social tags associated with the document by at least one of the plurality of users, the social tags comprising a text string containing one or more terms at least one of describing, categorizing and providing information regarding the document, and being indexed and stored in user profile tables separately from the document they are associated with;

determine, based on the social tags, a number ranking feature containing a number of times the document was tagged with the social tags by the plurality of users;

determine, based on the social tags, a textual property ranking textual stream containing a union of all the social tags associated with the document by the plurality of users;

transform the number ranking feature into a static input value by applying a normalization constant to the number ranking feature, the static input value being query independent;

transform the textual property ranking textual stream into a dynamic query dependent input value that is query dependent and includes a number of times a given term in a query appears in the textual property ranking textual stream; and determine a document rank for the document by inputting the static input value and the dynamic query dependent input value into a ranking function, and further inputting the document ranking features into the ranking function.

16. The optical disk, the solid state storage device or the magnetic storage device of claim 15, wherein the document is privately accessible only by a subset of the plurality of users.

17. The optical disk, the solid state storage device or the magnetic storage device of claim 15 having further computer-executable instructions stored thereon which, when executed by a computer, cause the computer to:

receive a query;

identify a plurality of documents that satisfy the query where the corresponding textual property ranking textual stream for each document contains each term in the query; and sort the plurality of documents according to their corresponding document rank.

18. The optical disk, the solid state storage device or the magnetic storage device of claim 15, wherein the ranking function comprises Okapi Simple Best Match 25F (BM25F); and the computer readable medium having further computer-executable instructions stored thereon which, when executed by the computer, cause the computer to input an output of Okapi Simple Best Match 25F (BM25F) into a two-layer neural network ranking function.

19. The optical disk, the solid state storage device or the magnetic storage device of claim 15, wherein to transform the textual property ranking textual stream into the dynamic query dependent input value, the computer-readable medium having further computer-executable instructions stored thereon which, when executed by a computer, cause the computer to input textual property information associated with the textual property ranking textual stream into a Okapi Simple Best Match 25F (BM25F) ranking function to generate the dynamic query dependent input value.

* * * * *